United States Patent [19]
Jackson et al.

[11] Patent Number: 6,091,487
[45] Date of Patent: Jul. 18, 2000

[54] LASER TRANSMITTER INCORPORATING AUTO SCAN DITHER ZONE

[75] Inventors: Jonathan A. Jackson, Dayton; Francisco Roberto Green, Tipp City, both of Ohio

[73] Assignee: Spectra Precision, Inc., Dayton, Ohio

[21] Appl. No.: 08/926,395

[22] Filed: Sep. 9, 1997

[51] Int. Cl.[7] .............................. G01B 11/26; G01C 1/00
[52] U.S. Cl. .......................................... 356/138; 356/147
[58] Field of Search .................................... 356/375, 400, 356/4, 152, 73, 138, 147, 142, 143, 144, 145, 148, 247, 248, 249

[56] References Cited

U.S. PATENT DOCUMENTS

| | | | |
|---|---|---|---|
| 3,823,313 | 7/1974 | Unema | 240/44.26 |
| 3,936,197 | 2/1976 | Aldrink et al. | 356/250 |
| 4,062,634 | 12/1977 | Rando et al. | 356/248 |
| 4,221,483 | 9/1980 | Rando | 356/250 |
| 4,662,707 | 5/1987 | Teach et al. | 350/6.5 |
| 4,676,634 | 6/1987 | Petersen | 356/4 |
| 4,830,489 | 5/1989 | Cain et al. | 356/73 |
| 4,895,440 | 1/1990 | Cain et al. | 356/5 |
| 5,042,042 | 8/1991 | Hori et al. | 372/32 |
| 5,144,486 | 9/1992 | Hart | 359/629 |
| 5,148,441 | 9/1992 | Itai | 372/70 |
| 5,182,756 | 1/1993 | Waki et al. | 372/38 |
| 5,196,693 | 3/1993 | Osaragi | 250/214 |
| 5,208,452 | 5/1993 | Osaragi | 250/208 |
| 5,257,279 | 10/1993 | Dugan et al. | 372/101 |
| 5,375,663 | 12/1994 | Teach | 172/4.5 |
| 5,453,833 | 9/1995 | Kawashima et al. | 356/345 |
| 5,511,085 | 4/1996 | Marshall | 372/22 |
| 5,513,001 | 4/1996 | Ohtomo et al. | 356/249 |
| 5,517,023 | 5/1996 | Ohtomo et al. | 250/234 |
| 5,535,003 | 7/1996 | Kawashima et al. | 356/345 |
| 5,583,685 | 12/1996 | Ohtomo et al. | 359/197 |
| 5,808,771 | 9/1998 | Ohtomo et al. | 359/196 |

FOREIGN PATENT DOCUMENTS

0643283 A1  3/1995  European Pat. Off. .
6201383    7/1994  Japan .

OTHER PUBLICATIONS

"Smart" Rotating Lasers, RL–S1A/S1B 1996 TOPCON Laser Systems, Inc., (4 pages).
Marksman RL–50 Series Rotating Lasers, 1994 TOPCON Laser Systems, Inc. (6 pages).
"MinuteMarker General Construction/Interior Laser System Model 1462" Brochure, Published Oct. 26, 1996.

Primary Examiner—Frank G. Font
Assistant Examiner—Michael P. Stafira
Attorney, Agent, or Firm—Killworth, Gottman, Hagan & Schaeff, LLP

[57] ABSTRACT

A laser transmitter and a method of transmitting a reference laser beam are provided comprising an auto scan dither mode. According to one aspect of the present invention, a laser transmitter is provided comprising a laser detection module, an optical system, and a controller. The laser detection module is operative to produce a reflected laser beam signal. The optical system is arranged to generate a reference laser beam selectively in one of a search mode and a target dither mode and to direct a reflected laser beam to the laser detection module. The optical system defines a rotational axis and the reference beam projects radially from the rotational axis. The search mode is characterized by movement of the reference beam through a rotational arc defined about the rotational axis and the target dither mode is characterized by movement of the reference beam through a dither zone occupying a portion of the rotational arc. The controller is programmed to produce selectively one of a target-sighted signal and a target-missing signal and produce a rotary position signal indicative of the position of the reference beam relative to the rotational arc. The controller is also programmed to identify a target position based upon the reflected laser beam signal and the rotary position signal and establish the dither zone about the target position. The dither zone is characterized by a dither range and the dither range is changed gradually in response to the target-sighted signal. The dither range is maintained substantially constant in response to the target-missing signal.

35 Claims, 8 Drawing Sheets

FIG. 8E

LASER TRANSMITTER INCORPORATING AUTO SCAN DITHER ZONE

CROSS-REFERENCE TO RELATED APPLICATIONS

This application is related to commonly assigned U.S. patent application Ser. Nos.: 08/834,476, LASER TRANSMITTER INCORPORATING TARGET DITHER, filed Apr. 11, 1997, by Green et al.; 08/834,472, POSITION LEVELING SENSOR FOR A LASER TRANSMITTER, filed Apr. 11, 1997, by Jackson et al.; 08/834,473, AUTOFOCUSING SYSTEM FOR A LASER TRANSMITTER, filed Apr. 11, 1997, by Green et al.; 08/834,477, FOCUSING MECHANISM USING A THIN DIAPHRAGM, filed Apr. 11, 1997, by Hayes; and, 08/833,978, SYSTEM FOR ADJUSTING THE ORIENTATION OF A PLANE OF LASER LIGHT, filed Apr. 11, 1997, by Detweiler et al., the disclosures of which are incorporated herein by reference.

BACKGROUND OF THE INVENTION

The present invention generally relates to transmission of a reference laser beam and, in particular, to an apparatus and method for dithering or oscillating a reference laser beam about one or more target areas.

Laser systems have been employed in numerous surveying and construction applications. In one such system, a laser light transmitting device provides a rotating laser beam that establishes a reference plane. Typically, the rotating laser beam is used to define, in effect, a continuous plane of light as a constant horizontal bench mark of elevation over an entire work area. The laser light is either detected by the naked eye or by one or more laser beam detectors placed at considerable distances from the transmitting device.

In a laser light transmitting device, a generally horizontal plane of light is produced by projecting the beam upward and then deflecting the beam ninety degrees within a pentaprism or penta-mirror assembly. The pentaprism assembly is rotated about a generally vertical axis within the transmitting device to cause the horizontal beam to sweep around the axis and define the horizontal plane.

Conventional laser transmitters incorporate a dither mode wherein a reference laser beam is dithered across a defined zone. The dither zone boundaries are set by physically moving a reflective target to locations corresponding to the preferred dither zone boundaries. Thus, typically, the user is forced to move the target from one end of the dither zone to the opposite end to define the zone. This may be difficult if the user is in a hazardous environment, on a ladder, etc. Further, care must be taken not to lose the laser beam as the user moves the target.

Accordingly, there is a need for a reference laser beam transmitter incorporating a target dither mode wherein the dither zone may be defined conveniently, without requiring a user to move the target along the entire extent of the dither zone.

BRIEF SUMMARY OF THE INVENTION

This need is met by the present invention, wherein a laser transmitter and a method of transmitting a reference laser beam are provided comprising an auto scan dither mode.

According to one aspect of the present invention, a laser transmitter is provided comprising a laser detection module, an optical system, and a controller. The laser detection module is operative to produce a reflected laser beam signal. The optical system is arranged to generate a reference laser beam selectively in one of a search mode and a target dither mode and to direct a reflected laser beam to the laser detection module. The optical system defines a rotational axis and the reference beam projects radially from the rotational axis. The search mode is characterized by movement of the reference beam through a rotational arc defined about the rotational axis and the target dither mode is characterized by movement of the reference beam through a dither zone occupying a portion of the rotational arc.

The controller is programmed to produce selectively one of a target-sighted signal and a target-missing signal and produce a rotary position signal indicative of the position of the reference beam relative to the rotational arc. The controller is also programmed to identify a target position based upon the reflected laser beam signal and the rotary position signal and establish the dither zone about the target position. The dither zone is characterized by a dither range and the dither range is changed gradually in response to the target-sighted signal. The dither range is maintained substantially constant in response to the target-missing signal.

The controller may be further programmed to (i) increase or decrease the dither range gradually towards a maximum or minimum dither range for the duration of the target-sighted signal, (ii) maintain the dither range substantially constant when the dither range reaches the maximum or minimum dither range, (iii) change the dither range gradually independently of whether the target position is stationary or moving, and (iv) cause the dither zone to track the target position. The dither zone may be characterized by a dither range center positioned substantially equidistant from opposite end points of the dither range, or by a pair of dither range end points, and the controller may be further programmed to maintain the dither range center or a selected end point, at the target position as the dither range is increased.

The controller may be further programmed to produce the target-missing signal in response to a target-missing condition which lasts for a predetermined amount of time, wherein the predetermined amount of time is sufficient to permit removal of a target from, and reinsertion of the target into, the dither zone.

The controller may also be programmed to produce a subsequent target-sighted signal, and discontinue operation in the target dither mode and initiate operation in the search mode in response to the subsequent target-sighted signal. The subsequent target-sighted signal may be produced in response to the presence of a target-sighted condition for a predetermined amount of time, wherein the predetermined amount of time is sufficient to permit insertion of a target into, and removal of a target from, the dither zone.

The search mode may be further characterized by modulation of the intensity of the reference laser beam. In contrast, the dither mode may be further characterized by toggled modulation of the intensity of the reference laser beam. The controller may be programmed to toggle the modulation on and off in response to the target-missing signal. The reference laser beam repetitively sweeps across the dither zone in first and second directions, and the modulation is preferably toggled on in the first direction and off in the second direction. The target-missing signal may be characterized by a target-missing duration and the controller may be programmed to toggle the modulation on and off in response to a target-missing duration exceeding a predetermined toggle delay value. The toggle delay value is preferably at least as great as an amount of time necessary to permit removal of a target from, and reinsertion of the target into, the dither zone.

The controller may be further programmed to produce a subsequent target-sighted signal and discontinue operation in the target dither mode and initiate operation in the search mode in response to the subsequent target-sighted signal and a subsequent target-sighted duration.

According to another aspect of the present invention, a method of transmitting a laser beam is provided comprising the steps of: moving a reference laser beam in a search mode, wherein the search mode is characterized by movement of the reference beam through a rotational arc defined about a rotational axis; monitoring a rotary position of the reference laser beam relative to the rotational arc; detecting a laser beam reflected from a target positioned within the rotational arc; producing a target-sighted signal in response to the detection of the reflected laser beam; producing a rotary position signal indicative of a position of the reference beam relative to the rotational arc; identifying a target position based upon the detection of the reflected laser beam and the rotary position signal; establishing a dither zone associated with the target position wherein the dither zone occupies a portion of the rotational arc and is characterized by a dither range; moving the reference beam in a target dither mode, wherein the target dither mode is characterized by reciprocative movement of the reference beam only through the dither zone; gradually changing the dither range in response to the target-sighted signal; and maintaining the dither range substantially constant in response to a target-missing signal.

The method may further comprise the step of maintaining a dither range center, or a dither range end point at the target position as the dither range is changed. The dither range may be changed independently of the target position. The intensity of the reference beam may be modulated and the modulation may be toggled on and off in response to a predetermined target-missing signal duration. The method may further comprise the step of focusing the reference laser beam at a target distance in response to receipt of the target-sighted signal.

Operation in the target dither mode may be discontinued and operation in the search mode initiated in response to a subsequent target-sighted signal and a predetermined target-missing signal duration. The method may also comprise the step of moving the reference beam in the search mode after detecting a laser beam reflected from a target positioned within the dither zone following movement of the reference beam in the target dither mode.

Accordingly, it is a primary object of the present invention to provide a laser beam transmitter and a method of operation incorporating an auto scan target dither mode wherein the dither zone may be defined conveniently, without requiring a user to move a target through a work area within the preferred dither zone. Other objects of the present invention will be apparent in light of the description of the present invention embodied herein.

DETAILED DESCRIPTION OF THE INVENTION

Figure 1:
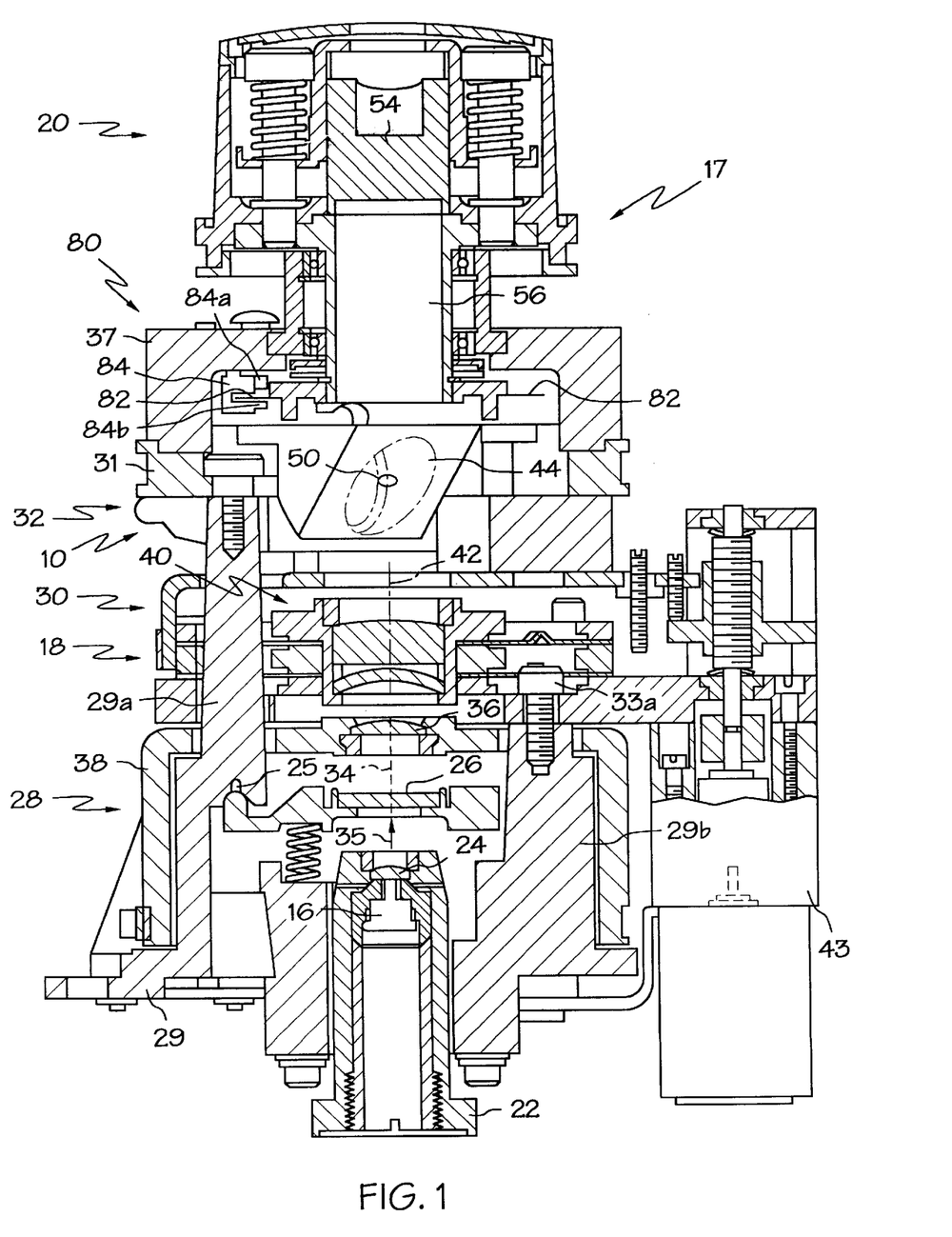
FIG. 1 is a cross-sectional view of a laser transmitter according to the present invention.
Figure 2:
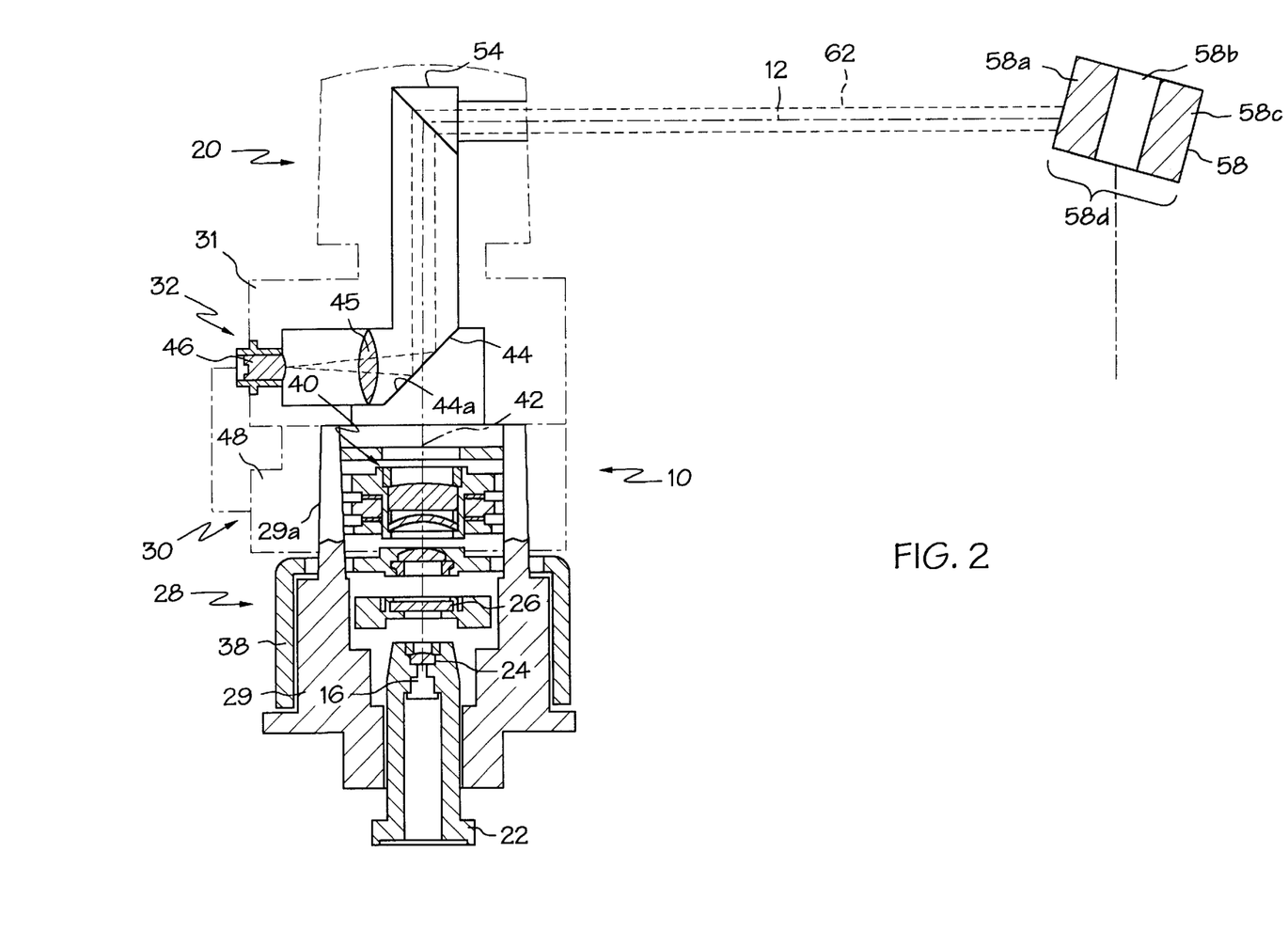
FIGS. 2 and 3 are schematic illustrations of laser beam transmitting systems according to the present invention.

Referring now to FIGS. 1 and 2, a laser beam transmitter 10 for generating a reference laser beam 12 is shown. The laser beam transmitter 10 includes a light source 16, and an optical system 17 including an optical assembly 18 and an optical projecting device 20. The light source 16 is coupled to a light source assembly 22. According to the illustrated embodiment, the light source 16 is a laser diode which generates the reference laser beam 12. The light source assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28, and a focusing mechanism 30. The compensator assembly 28 includes an optics frame 29, a compensator cup 38 and a wire clamp ring 31. The optics frame 29 is coupled to and supported by a housing (not shown). The light source assembly 22 is coupled to the optics frame 29. The flat window 26 is positioned above the collection lens 24, and is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical or a rotational axis 34. The laser beam 12 will therefore be plumb, i.e., substantially vertical, when the optics frame 29 is positioned along a plane which is substantially parallel with respect to the plane of the ground, i.e., substantially level. The laser beam 12 is projected in the first direction 35 by the light source 16 and the collection lens 24 and made plumb along the first axis 34 through the flat window 26. The laser beam 12 will be plumb as long as the optics frame 29 is substantially level with respect to the ground.

The compensator assembly 28 optically adjusts the position of the laser beam 12 so that it is plumb even when the optics frame 29 is not substantially level. The compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts (only one post 29a shown). The compensator cup 38 is free to move when the compensator cup 38 is level within 12 minutes. As long as the compensator cup 38 is within 12 minutes of level, the compensating lens 36 may translate along the X and Y axes and optically adjust the position of the laser beam 12 so that it is plumb as it emerges from the compensator cup 38. The housing is provided within an automatic or manual leveling device (not shown) to place the compensator assembly 28 within 12 minutes of level. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along the first axis 34, either singularly or in tandem.

The focusing mechanism 30 is positioned above the compensator cup 38 and is coupled to the optics frame 29 through three small posts (only one small post 29b shown) by three fasteners (only one fastener 33 shown). The three posts 29a of the optics frame 29 pass through the focusing mechanism 30 so that the focusing mechanism 30 does not contact the compensator cup 38. The focusing mechanism 30 includes a focusing lens 40 which is translated along the first axis 34 to adjust the focus of the laser beam 12. The focusing mechanism 30 is positioned so that the first axis 34 coincides with an optical axis 42 of the focusing lens 40. A plumb laser beam 12 is focused by the focusing mechanism 30. The focusing mechanism 30 includes a focus moter 43 coupled to the focusing lens 40. The focus motor 43 is adapted to change the position of the focusing lens 40 thereby adjusting the focus of the laser beam 12.

The wire clamp ring 31 is positioned above the focusing mechanism 30. The wire clamp is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser beam transmitter 10.

A laser detection module 32 is coupled to the optics frame 29 and is positioned above the focusing mechanism 30. As shown in FIGS. 2 and 6B, the detection module 32 includes a reflector 44, a lens 45, a photodetector 46 and a detector circuit 48 and is operative to produce a reflected laser beam signal 64. The reflector 44 includes an aperture 50 positioned along optical axis 42, see FIG. 1. The aperture 50 is sized to pass the laser beam 12. The reflector 44 also includes a reflective surface 44a to reflect returned light to the photodetector 46.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical and direct the laser beam 12 such that it projects radially from the rotational axis 34. The pentaprism 54 is a structure which deflects incoming light at a ninety degree angle with respect to the vertical regardless of the incident angle of the light on the pentaprism 54. Consequently, the incoming light does not have to hit the pentaprism 54 at an exact location in order to be deflected ninety degrees.

Figure 3:
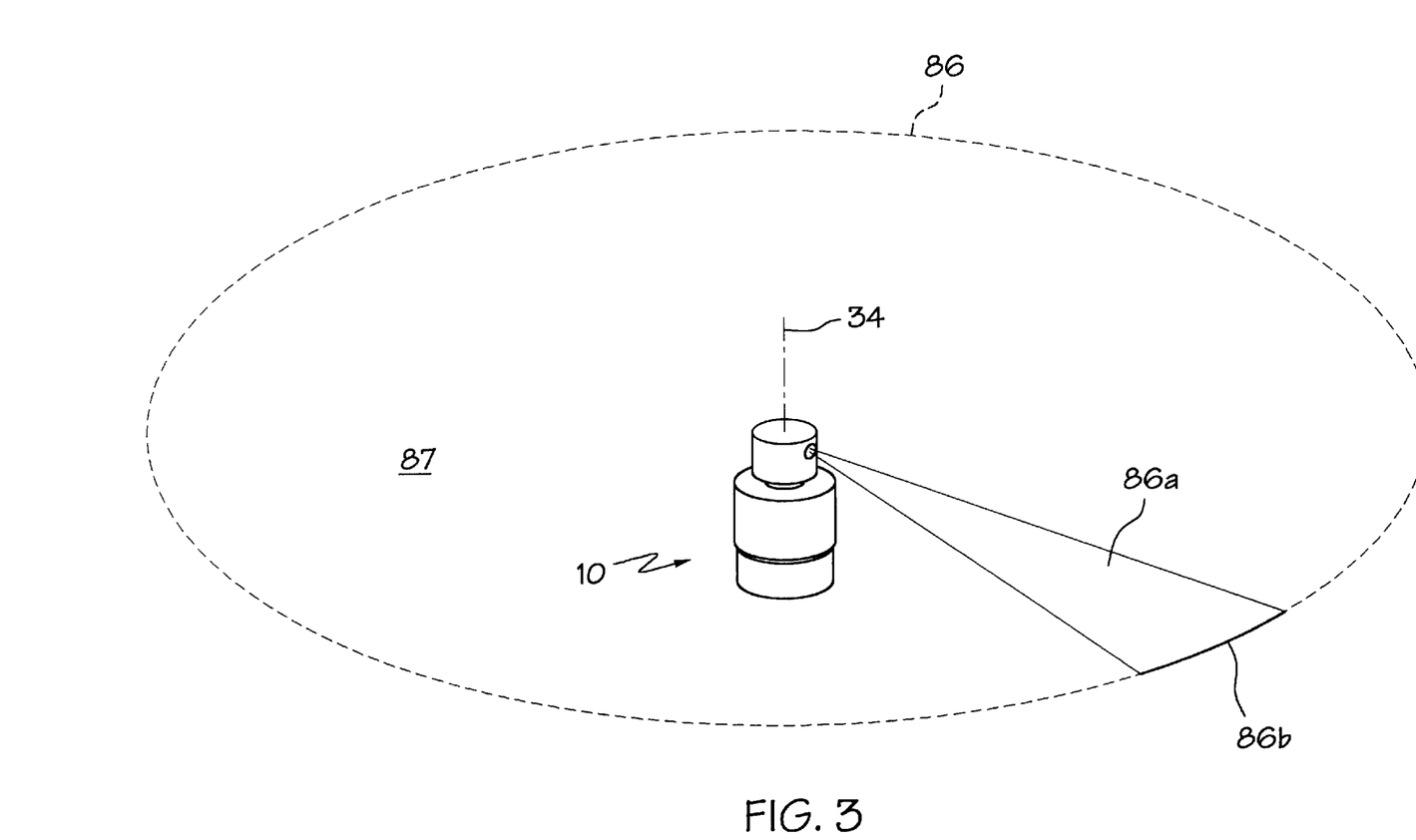

Referring additionally to FIG. 3, and with further reference to the structure of FIGS. 1 and 2, the movement of the reference laser beam 12 in a search mode and a target dither mode is described. In the search mode, described in detail below, the pentaprism 54 is rotated with the spindle 56 by the motor at a speed of approximately 50 rpm to move the reference laser beam 12 through a rotational arc 86 about the central axis 34 and define a substantially horizontal plane of light 87. Alternatively, in the target dither mode, also described in further detail below, the pentaprism 54 is rotated back and forth through a portion or dither range 86b of the rotational arc 86 to define a dither zone 86a.

A speed of 50 rpm is well suited for visible perception of the laser light 12 by the user. However, as will be appreciated by those skilled in the art, the pentaprism 54 may be rotated at any reasonable speed without departing from the scope of the present invention. Further, while a pentaprism is used in the illustrated embodiment to deflect the incoming light, other light deflecting devices, such as a pentamirror, mirror, prism, reflector or refractor may also be used.

The laser beam transmitter 10 also includes an optical rotary encoder 80, see FIG. 1, arranged to enable production of a rotary position signal indicative of a rotary position of the reference laser beam 12 relative to the rotational arc 86. The optical rotary encoder 80 includes an encoder disc 82 and a read head 84. The encoder disc 82 has graduations around its periphery which are read by the read head 84. The read head 84 includes an optical source 84a and an optical detector 84b. The encoder disc 82 is positioned between the optical source 84a and the optical detector 84b so that as the encoder disc 82 rotates, the read head 84 generates a signal representative of the rotary position of the encoder disc 82, and hence, the pentaprism 54 and the reference laser beam 12. As is well known in the art, the encoder disc 82 may contain graduations which are spaced in a manner so that each position around the disc is uniquely referenced. Alternatively, as is the case in the illustrated embodiment, the encoder disc 82 may contain a reference mark and a number of equally spaced graduations so that the position around the disc is referenced to the reference mark. It is contemplated by the present invention that a variety of positional indicators may be provided on the encoder disc 82 and that a corresponding variety of read head 84 elements may be provided to recognize or decode the positional indicators. As a further alternative, the rotary position signal may be produced by monitoring a time period associated with movement of the reference laser beam through a rotational arc. Specifically, the rotary position of the reference beam may be determined merely by (i) measuring the amount of time elapsed from a starting or home laser beam rotary position to a subsequent position and (ii) multiplying the time by the known rotational speed of the reference laser beam.

Figure 6A:
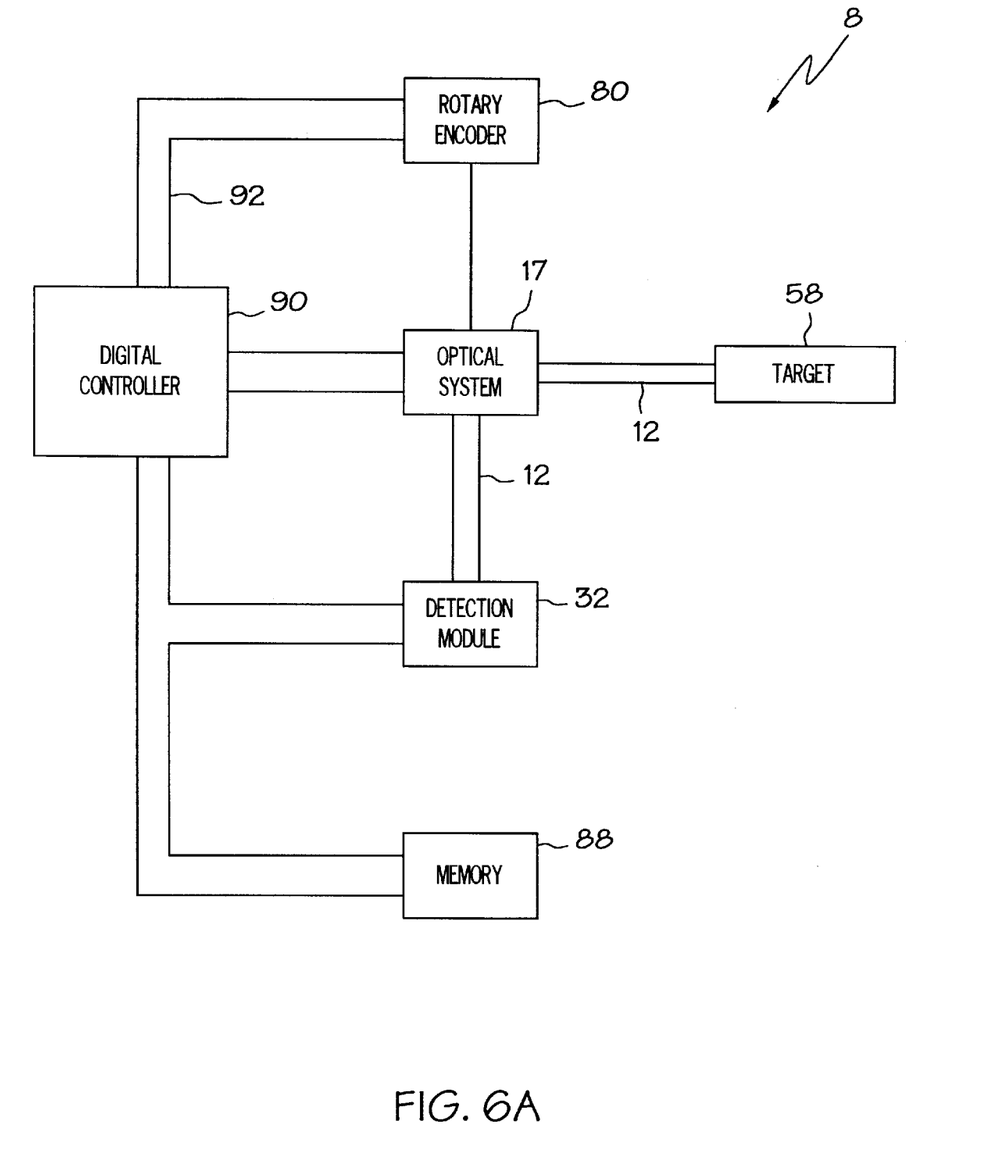
FIG. 6A is a schematic illustration of a laser transmission system according to the present invention.
Figure 6B:
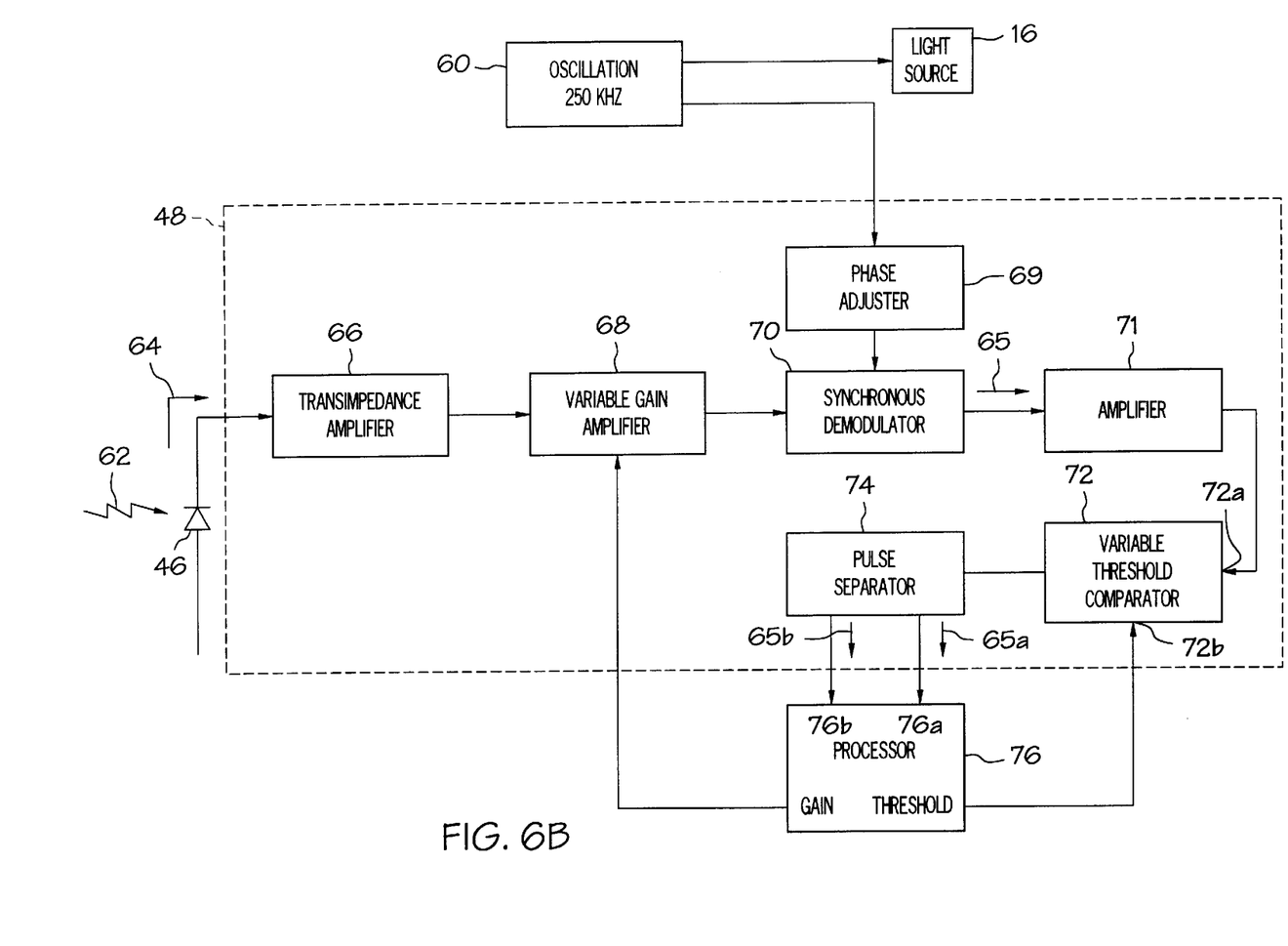
FIG. 6B is a schematic illustration of a portion of a laser detection module of a laser transmitter according to the present invention.

Referring now to FIGS. 2, 6A and 6B, a laser beam transmitting system 8 according to the present invention is described. The transmitting system 8 includes a reflective target 58, the laser detection module 32, the optical system 17, the rotary encoder 80, a memory 88, and a digital controller 90, most commonly a digital central processing unit (CPU). The digital controller 90, also referred to herein as a processor, communicates with the other system components via data bus 92. The laser beam 12 is illustrated schematically as a double line in FIG. 6A.

The reflective target 58 comprises an active target portion 58d, see FIG. 2, defined by three discrete target portions 58a, 58b, 58c having respective predetermined widths a, b, c, and characteristic reflectances $R_A$, $R_B$, $R_C$. Preferably, the second target portion 58b is bounded on opposite sides by the first and third target portions 58a, 58c. The second characteristic reflectance $R_B$ is relatively low, as compared to the first and third characteristic reflectances $R_A$, $R_C$, which are relatively high and substantially equal. It will be appreciated by those skilled in the art that the target 58 may comprise more than three total portions. It will be further appreciated by those skilled in the art that the portions 58a, 58b, 58c may have different or equal widths. The detection module 32 is designed to detect light reflected from the target 58 and produce the reflected laser beam signal 64. Toward this end, it is preferred that first and third target positions, 58a and 58c, are coated with a retroreflective material such that much of the light from the transmitter 10 is returned to the transmitter 10 along the path of the beam 12.

In the illustrated embodiment, the target 58 is comprised of a single integral unit including discrete target portions 58a, 58b, 58c. However, the target 58 may be comprised of discrete first and third portions 58a, 58c coupled together with an empty space there between representing the second portion 58b. Further, the target 58 may comprise separate and distinct portions 58a, 58b and 58c which are positioned a set distance from each other, or separate and distinct reflective sections 58a, 58c separated a set distance from each other.

During transmission, the laser beam 12 is modulated in intensity by an oscillator 60 which supplies power to the light source 16, as shown in FIG. 6B. The laser beam 12 is modulated to distinguish the laser beam 12 from other light sources, such as any of the numerous other ambient light sources. Preferably, the oscillator 60 generates a 250 kHz carrier oscillation signal. It will be appreciated by those skilled in the art that other frequencies may be used to modulate the intensity of the laser beam 12. It should be further appreciated by those skilled in the art that the laser beam 12 may be transmitted without any modulation. As shown in FIG. 2, the modulated laser beam 12 is swept across the target 58. A reflected beam of laser light 62 is reflected back towards the laser beam transmitter 10. For clarity and ease of description, the reflected beam of laser light 62 has been given a separate designation from the laser beam 12.

The reflected beam of laser light 62 consists of two pulses of light each time the laser beam 12 is reflected from the first and second reflective sections 58a, 58c of the target 58, see FIGS. 2 and 6B. The reflected light 62 is received by the pentaprism 54 and reflected towards the reflector 44. The reflected light 62 is then reflected by the reflective surface 44a of reflector 44 and focused by the lens 45 onto the photodetector 46.

Figure 4:
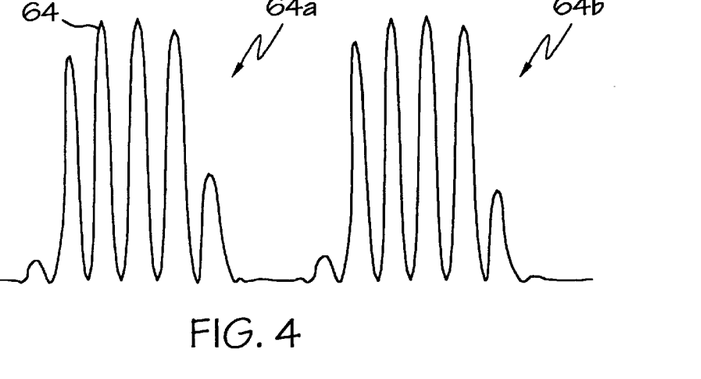
FIG. 4 is a waveform representative of modulated light reflected from the target of FIG. 2.

As shown in FIG. 4, the photodetector 46 generates the reflected laser beam signal 64 having a waveform representative of the reflected light 62. In the illustrated embodiment, the photodetector 46 is a PIN diode such that the signal 64 is in current form. The waveform comprises two pulses representative of the time periods in which the laser beam 12 sweeps across the first and second reflective sections 58a, 58c of the target 58. The signal 64 is basically an amplitude modulated signal with a data signal portion 65 and the 250 kHz carrier oscillation signal portion 67 (see FIGS. 5A and 5B). The signal 64 is transmitted to the detector circuit 48, see FIG. 6B.

Referring to FIG. 6B, the detector circuit 48 includes a transimpedance amplifier 66, a variable gain amplifier 68, a phase adjuster 69, a synchronous demodulator 70, an amplifier 71, a variable threshold comparator 72 and a pulse separator 74. The photodetector 46 is coupled to the transimpedance amplifier 66. The transimpedance amplifier 66 converts the current form of the reflected laser signal 64 generated by the photodetector 46 to a voltage form of the signal 64. The voltage form of the signal 64 is transmitted to the variable gain amplifier 68. In the illustrated embodiment, the variable gain amplifier 68 has a low gain mode and a high gain mode. The low gain mode is used when the target 58 is close to the laser beam transmitter 10 since more light is reflected back. The high gain mode is used when the target 58 is far from the laser beam transmitter 10 since less light is reflected back. The variable gain helps prevent the detector circuit 48 from saturating when an excessive amount of light is reflected back to the laser beam transmitter 10. It will be appreciated by those skilled in the art that the transimpedance amplifier 66 could be a variable gain transimpedance amplifier. It will be fully appreciated by those skilled in the art that the detector circuit 48 could be prevented from going into saturation by using a conventional clipping circuit.

Figure 5A:
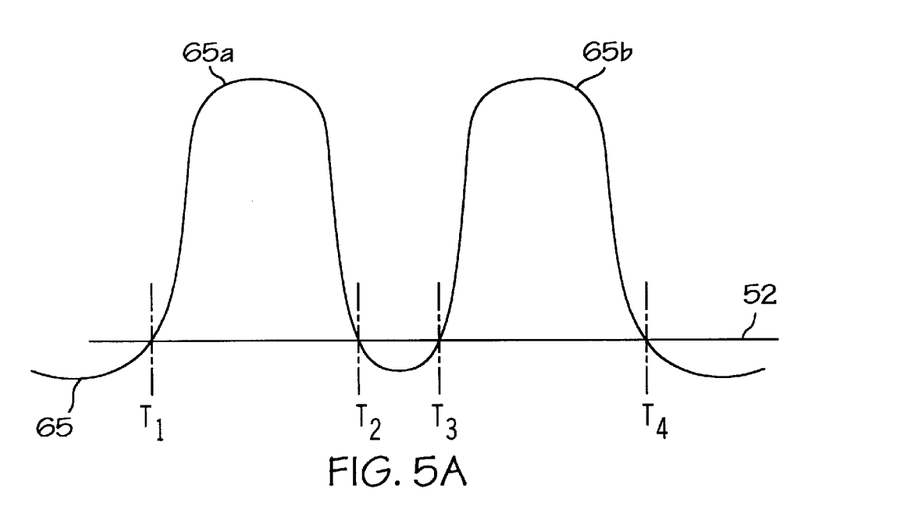
FIG. 5A is a waveform of a data signal portion of the waveform of FIG. 4.
Figure 5B:
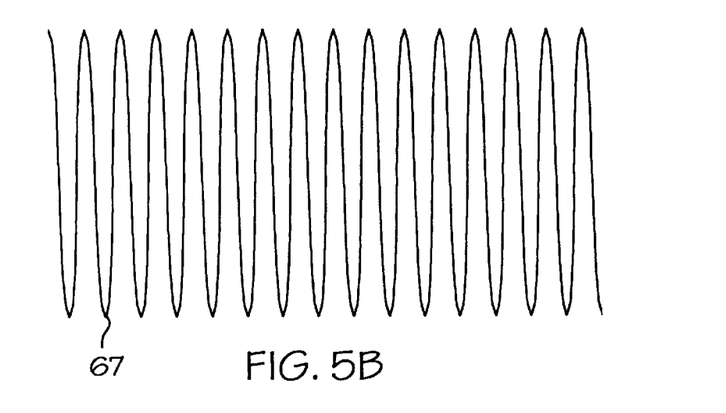
FIG. 5B is a waveform of a carrier oscillation portion of the waveform of FIG. 4.

The phase adjuster 69 receives the carrier oscillation signal which was used to modulate the laser beam 12. The phase adjuster 69 adjusts the phase of the carrier oscillation signal to match the phase of the reflected laser beam signal 64. The adjusted oscillation signal is fed to the synchronous demodulator 70 along with the signal from the variable gain amplifier 68. The synchronous demodulator 70 separates the carrier oscillation signal portion 67 from the data signal portion 65. As shown in FIG. 5A, the data signal portion 65 comprises a first pulse 65a and a second pulse 65b. The synchronous demodulator 70 outputs the data signal portion 65 which is then amplified by the amplifier 71.

The amplified data signal portion 65 is inputted into a first input 72a of the variable threshold comparator 72. A second input 72b of the variable threshold comparator 72 receives a threshold voltage which sets the threshold capability of the variable threshold comparator 72. A threshold voltage is used to filter out background noise that may be detected by the photodetector 46. The variable threshold comparator 72 outputs the portions of the amplified data signal portion 65 which exceed the voltage threshold as established by the second input 72b. As the laser beam 12 is swept across the reflective sections 58a, 58c, the data signal pulses 65a, 65b extracted by the detection circuit 48 should exceed the threshold voltage.

The threshold voltage may be adjusted based on the approximate distance between the target 58 and the laser beam transmitter 10. A lower threshold voltage may be set when a relatively weak signal is received while a higher threshold voltage may be set when a relatively strong signal is received. A stronger signal will be generated as the target 58 is moved closer to the laser beam transmitter 10. A suitable threshold 52 is illustrated graphically in FIG. 5A.

The amplified data signal portion 65 outputted from the variable threshold comparator 72 is inputted into the pulse separator 74. The pulse separator 74 separates the two pulses 65a, 65b into separate component pulses, i.e. the first pulse 65a and the second pulse 65b. The first pulse 65a is transmitted to a first timer input 76a of a processor 76 while the second pulse 65b is transmitted to a second timer input 76b of the processor 76. The processor 76, which may be integrated with the digital controller 90 illustrated herein with reference to FIG. 6A, includes an internal clock and an edge detector which establish the time interval in which a transition is made by each pulse 65a, 65b.

As shown in FIG. 5A, the first transition is set as $T_1$, the second transition is set as $T_2$, the third transition is set as $T_3$ and the fourth transition is set as $T_4$. The first time of the dither zone 86a, focusing data, distance data indicative of the distance to a target 58 associated with one dither zone 86a, gain and threshold data associated with the dither zone 86a, and any other data representative of, or related to, the operation of the laser transmitter 10 are stored in the memory 88. In the target dither mode, the reference laser beam 12 moves back and forth across the target 58, reversing direction at the bounds of the dither zone 86*a*. The controller 90 is further programmed to cause the optical system 17 to change from the search mode, wherein the reference laser beam 12 is moved through the rotational arc 86 to define a substantially horizontal plane of light, to the target dither mode according to the reflected laser beam signal 64.

An auto scan dither zone mode of the present invention is described in detail with primary reference to FIGS. 7 and 8A–8E. The auto scan mode is activated in response to a signal initiated at, or received by, the laser transmitter 10, e.g., by pressing an "activate auto scan" button on the transmitter 10, see step 100. In response, standard operating variables, timers, and counters are initiated in a manner understood by those of ordinary skill in the art, see step 102. Modulation of the laser beam intensity is initiated and the software for decoding reflected laser beam signals is enabled in step 104. The intensity of the laser beam is modulated to enable proper discrimination of light reflected from the target 58 from ambient light or light from a source other than the laser transmitter 10. A variety of intensity modulation and decoding schemes are applicable to the present invention, as will be appreciated by those of ordinary skill in the art. Subsequently, a reference plane of laser light is defined by moving the reference beam through the rotational arc 86, see FIG. 8A and step 106.

The controller 90 is programmed to produce selectively one of a target-sighted signal and a target-missing signal according to the nature of the reflected laser beam signal 64, see FIGS. 6A and 6B. If the reflected laser beam signal 64 indicates that the target 58 is positioned in the path of the reference laser beam 12, the target-sighted signal is generated, the dither zone 86*a* characterized by the dither range 86*b* is set, period, $T_2$–$T_1$, represents the duration of time in which the laser beam 12 sweeps across the first reflective section 58*a* of the target 58. The second time period or deadband period, $T_3$–$T_2$, represents the duration of time in which the laser beam 12 sweeps across the non-reflective section 58*b* of the target 58. The third time period, $T_4$–$T_3$, represents the duration of time in which the laser beam 12 sweeps across the second reflective section 58*c* of the target 58. Accordingly, the first, second, and third time periods are proportional to the respective widths of the discrete target portions 58*a*, 58*b*, 58*c*.

According to one embodiment of the present invention, the controller 90 is programmed to identify the position of the target 58 based upon the reflected laser beam signal 64 and the rotary signal. In the search mode, the reference laser beam 12 is moved through the rotational arc 86 to define a substantially horizontal plane of light. The reflective target 58, positioned in the path of the laser beam 12, causes a portion of the reference laser beam 12 to return to the optical system 17 and be directed to the laser detection module 32. Thus, when the laser beam 12 sweeps across the first and third reflective sections 58*a*, 58*c* of the target 58, the amplitude of the reflected laser beam signal 64 produced by the detection module 32 cycles through a pair of reflective pulses 64*a*, 64*b*. The position of the target 58, relative to the rotational arc 86, is determined or identified by the controller 90 based upon the reflected laser beam signal 64 and the rotary position signal by identifying the rotary position of the laser beam 12 when the laser beam 12 sweeps across the target 58.

The controller 90 is programmed to establish a dither zone 86*a* about the target position, see FIG. 3. The dither zone 86*a* is characterized by a dither range 86*b* corresponding to a portion of the rotational arc 86, see FIGS. 3 and 8B–8E. The dither zone 86*a* is characterized by a dither range center positioned substantially equidistant from opposite end points of the dither range 86*b*. Data indicative of the dither zone 86*a*, and other operational data, is stored in the memory 88 to enable proper control of the laser transmitter 10. Specifically, positional or angular data indicative of the location and the laser beam transmitter 10 begins operation in the dither mode, see FIG. 8B. The dither zone 86*a* is set such that the target 58 lies at the center of the dither range 86*b*, see steps 108 and 110. Next, the laser beam 12 is focused on the target 58, see step 112, and the target 58 is kept at the center of the dither range 86*b*, by adjusting the position of the center of the dither range 86*b*, see step 114. Specifically, the controller 90 is programmed to determine whether the position of the target 58 within the dither zone 86*a* has changed. This determination is again based upon the reflected laser beam signal 64 and the rotary signal. If the position of the target 58 has changed, the position of the dither zone 86*a* is altered such that the center of the target 58 corresponds to the center of the dither range 86*b*. In this manner, the dither zone 86*a* tracks the target position, see FIGS. 8C and 8D.

If the reflected laser beam signal 64 indicates that the target 58 has disappeared, the target-missing signal is generated. The auto scan sequence restarts if the target-missing signal is generated before focus is achieved, see steps 116 and 118. According to one aspect of the present invention, the controller 90 is further programmed to produce the target-missing signal in response to the presence of a target-missing condition for a predetermined amount of time. Specifically, if the reflected laser beam signal indicates that the target 58 is missing for a predetermined amount of time, e.g., two seconds, the target-missing signal is generated. If the reflected laser beam signal indicates that the target 58 is missing for less than the predetermined amount of time, e.g., less than two seconds, the target-missing signal is not generated. Preferably, the predetermined amount of time is sufficient to permit removal of the target 58 from, and reinsertion of the target into, the dither zone 86*a*. In this manner, if the target 58 is inadvertently removed from the path of the reference beam 12, generation of the target-missing signal can be prevented by replacing the target in the path of the beam 12 before the predetermined time lapses.

Figure 8A:
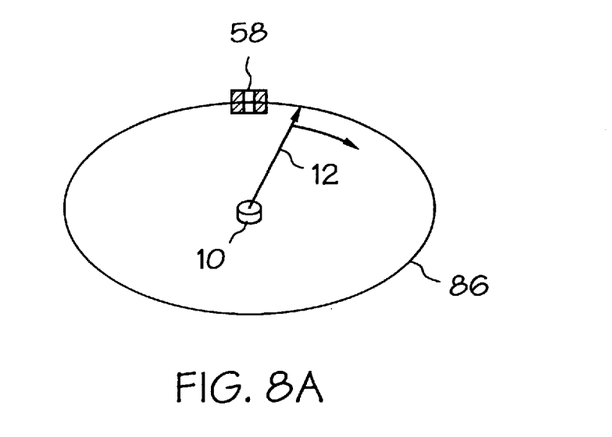
FIGS. 8A to 8E are schematic illustrations of a laser transmitter in an auto scan dither mode according to the present invention.
Figure 8B:
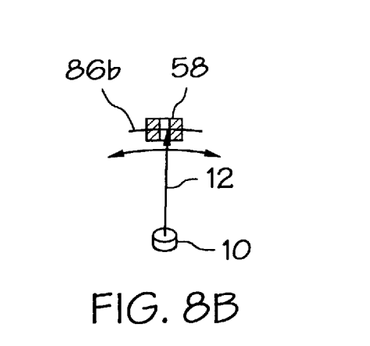
Figure 8C:
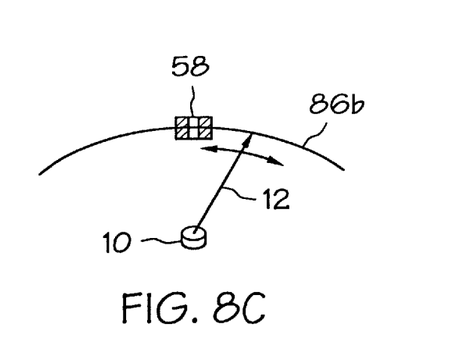
Figure 8D:
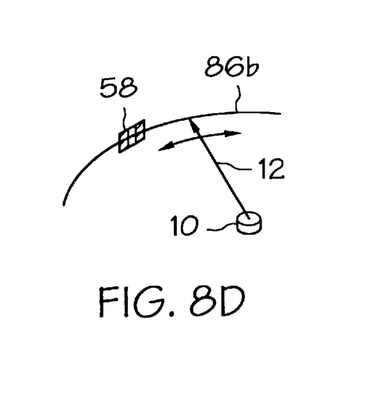
Figure 8E:
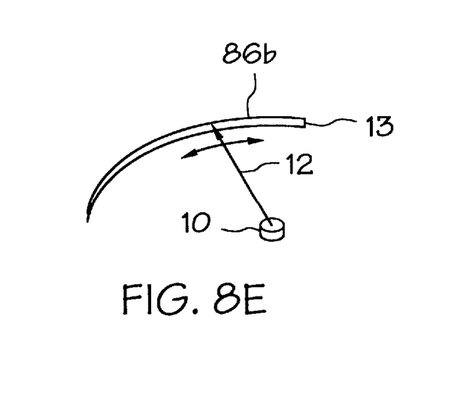

The dither range 86*b* is gradually increased, e.g., in preselected increments, in response to the target-sighted signal and after focus is achieved, see step 120. FIGS. 8B and 8C illustrate the gradual increase in dither range 86*b*. The center of the dither range 86*b* is held at the center of the target 58 in the manner described above, as the dither zone increases incrementally, see step 122. If the target 58 is missing, i.e., if the reflected signal 64 ceases to indicate that the target 58 is positioned in the path of the laser beam 12, the target-missing signal is generated and the dither range 86*b* is maintained substantially constant, see steps 124 and 128. The controller 90 is further programmed to increase the dither range 86*b* gradually towards a maximum dither range for the duration of the target-sighted signal. The dither range 86*b* is maintained substantially constant when it reaches the maximum dither range, see step 126. As will be appreciated by those of ordinary skill in the art, the rate at which the dither range 86*b* increases and its maximum size depend upon the particular needs and preferences of those practicing the present invention. As will be further appreciated by those practicing the present invention, it is not necessary to move or reposition the target 58 to increase the dither range 86*b* because the dither range 86b increases gradually independently of whether the target 58 is moved.

Figure 7:
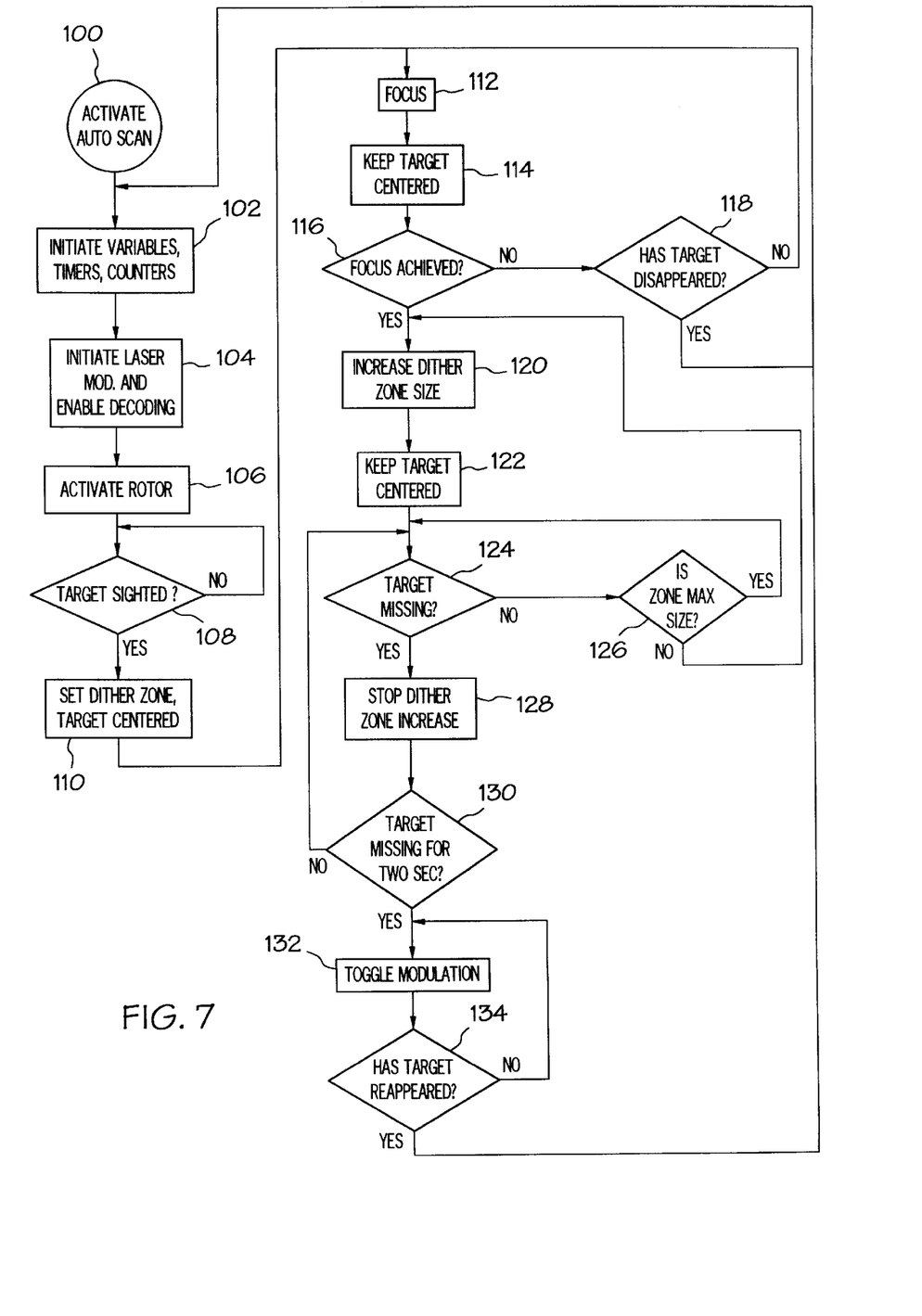
FIG. 7 is a flow chart illustrating an auto scan dither mode according to the present invention.

It is contemplated by the present invention that, as an alternative to increasing the dither range 86b after a relatively small initial dither zone 86a is set in step 110, see FIG. 7, a relatively large initial dither zone 86a could be set and the dither range 86b thereof could be subsequently decreased. As will be appreciated by those practicing the present invention, this decreasing dither range alternative would require corresponding inversion or alteration of some of the steps set forth in FIG. 7. As a further alternative to merely bypassing the dither zone increase step 120 when the zone 86a reaches its maximum size, it is contemplated by the present invention that the dither range 86b could be subsequently decreased towards a minimum size until a target missing signal is generated, see step 130. Similarly, where the dither zone 86a reaches its minimum size, the dither range 86b could be subsequently increased towards a maximum size until a target missing signal is generated.

It is further contemplated by the present invention that, as an alternative to increasing or decreasing the dither range bi-directionally while keeping the target 58 at the center of the dither zone 86a, see step 122, the dither range 86b could be controlled to increase or decrease in only one direction while the target 58 is kept at one end of the dither zone 86a.

The intensity modulation initiated in step 104 is toggled on and off if a target-missing condition is present for a predetermined amount of time after focus has been achieved and the dither zone increase has been initiated, see steps 130 and 132. Specifically, the target-missing signal is characterized by a target-missing duration and the controller 90 is programmed to toggle the intensity modulation on and off when the target-missing duration exceeds a predetermined toggle delay value, e.g., two seconds or more. Preferably, the toggle delay value is at least as great as an amount of time necessary to permit removal of the target 58 from, and reinsertion of the target 58 into, the dither zone 86a. In this manner, if the target 58 is inadvertently removed from the path of the reference beam 12 while the dither range 86b is increasing, initiation of toggle modulation can be prevented by replacing the target 58 in the path of the beam 12 before the predetermined time lapses.

The intensity modulation is toggled on to preserve the ability to detect the reflected laser beam 62 in the dither mode and is toggled off to increase the average intensity of the reference laser beam 12 as the beam moves back and forth in the dither zone. In this manner the average intensity of the reference laser beam 12 across the dither zone 86a is increased and the reference laser beam 12 becomes more visible or detectable. The increased intensity is illustrated schematically in FIG. 8E, where a toggled intensity beam path 13 is shown. According to one aspect of the present invention, the modulation is toggled on in a first beam sweep direction through the dither zone 86a, and off in a second, opposite, sweep direction. It is contemplated by the present invention that the particular toggle scheme selected in practicing the present invention depends on the particular preferences of those practicing the invention. For example, the modulation could be toggled on for a predetermined amount of time or a predetermined range of movement and off for another amount of time or range of movement.

The intensity modulation will continue to be toggled on and off until a target reappears in the path of the laser beam 12, see step 134. The auto scan sequence is restarted if the target 58 reappears, see step 134. Specifically, the controller 90 is programmed to produce a subsequent target-sighted signal if the target 58 is positioned in the dither zone 86a of the reference laser beam 12. Upon generation of the subsequent target-sighted signal, operation in the target dither mode is discontinued and operation in the search mode is initiated. According to a preferred aspect of the present invention, the subsequent target-sighted signal is not produced unless a subsequent target-sighted condition is present for a predetermined amount of time, e.g., two seconds. Preferably, the predetermined amount of time is sufficient to permit insertion of the target 58 into, and removal of the target 58 from, the dither zone 86a. In this manner, if the target 58 is inadvertently inserted into the path of the reference beam 12, production of the subsequent target-sighted signal can be prevented by removing the target 58 from the path of the beam 12 before the predetermined time lapses.

Having described the invention in detail and by reference to preferred embodiments thereof, it will be apparent that modifications and variations are possible without departing from the scope of the invention defined in the appended claims.

What is claimed is:

1. A laser transmitter comprising:

a laser detection module operative to produce a reflected laser beam signal;

an optical system arranged to generate a reference laser beam selectively in one of a search mode and a target dither mode and to direct a reflected laser beam to said laser detection module, wherein said optical system defines a rotational axis, said reference beam projects radially from said rotational axis, said search mode is characterized by movement of the reference beam through a rotational arc defined about said rotational axis, and wherein said target dither mode is characterized by movement of said reference beam through a dither zone occupying a portion of said rotational arc; and a controller programmed to produce selectively one of a target-sighted signal and a target-missing signal, wherein said target-sighted signal is produced in response to detection of said reflected laser beam, produce a rotary position signal indicative of a position said reference beam relative to said rotational arc, identify a target position based upon said reflected laser beam signal and said rotary position signal, establish said dither zone about said target position, wherein said dither zone occupies a portion of said rotational arc and is characterized by a dither range, move said reference beam in said target dither mode, wherein said target dither mode is characterized by reciprocative movement of said reference beam only through said dither zone, change a magnitude of said dither range in response to said target-sighted signal, and maintain a magnitude of said dither range substantially constant in response to said target-missing signal.

2. A laser transmitter as claimed in claim 1 wherein said controller is further programmed to increase said dither range towards a maximum dither range for the duration of said target-sighted signal.

3. A laser transmitter as claimed in claim 2 wherein said controller is further programmed to maintain said dither range substantially constant when said dither range reaches said maximum dither range.

4. A laser transmitter as claimed in claim 1 wherein said controller is further programmed to decrease said dither range towards a minimum dither range for the duration of said target-sighted signal.

5. A laser transmitter as claimed in claim 4 wherein said controller is further programmed to maintain said dither range substantially constant when said dither range reaches said minimum dither range.

6. A laser transmitter as claimed in claim 1 wherein said controller is further programmed to sequentially and alternatively increase said dither range towards a maximum dither range and decrease said dither range towards a minimum dither range for the duration of said target-sighted signal.

7. A laser transmitter as claimed in claim 1 wherein said controller is further programmed to increase said dither range towards a maximum dither range when said dither range reaches a minimum dither range and decrease said dither range towards a minimum dither range when said dither range reaches said maximum dither range.

8. A laser transmitter as claimed in claim 1 wherein said controller is further programmed to change said dither range independently of whether said target position is stationary or moving.

9. A laser transmitter as claimed in claim 1 wherein said controller is further programmed to cause said dither zone to track said target position.

10. A laser transmitter as claimed in claim 1 wherein said dither zone is characterized by a dither range center positioned substantially equidistant from opposite end points of said dither range and wherein said controller is further programmed to maintain said dither range center at said target position.

11. A laser transmitter as claimed in claim 10 wherein said controller is further programmed to maintain said dither range center at said target position as said dither range is changed.

12. A laser transmitter as claimed in claim 1 wherein said dither zone is characterized by a pair of dither range end points and wherein said controller is further programmed to maintain a selected one of said dither range end points at said target position.

13. A laser transmitter as claimed in claim 12 wherein said controller is further programmed to maintain said selected end point at said target position as said dither range is changed.

14. A laser transmitter as claimed in claim 1 wherein said dither zone is characterized by a dither range center positioned in substantial alignment with said target position and wherein said controller is further programmed to change said dither range such that said dither range center remains substantially aligned with said target position.

15. A laser transmitter as claimed in claim 1 wherein said dither zone is characterized by a dither range end point positioned in substantial alignment with said target position and wherein said controller is further programmed to change said dither range such that said dither range end point remains substantially aligned with said target position.

16. A laser transmitter as claimed in claim 1 wherein said controller is further programmed to produce said target-missing signal in response to the presence of a target-missing condition for a predetermined amount of time, wherein said predetermined amount of time is sufficient to permit removal of a target from, and reinsertion of said target into, said dither zone.

17. A laser transmitter as claimed in claim 1 wherein said controller is further programmed to:
produce a subsequent target-sighted signal; and
discontinue operation in said target dither mode and initiate operation in said search mode in response to said subsequent target-sighted signal.

18. A laser transmitter as claimed in claim 17 wherein said subsequent target-sighted signal is produced in response to the presence of a target-sighted condition for a predetermined amount of time, wherein said predetermined amount of time is sufficient to permit insertion of a target into, and removal of a target from, said dither zone.

19. A laser transmitter as claimed in claim 1 wherein said search mode is further characterized by modulation of the intensity of said reference laser beam.

20. A laser transmitter as claimed in claim 1 wherein said dither mode is further characterized by toggled modulation of the intensity of said reference laser beam.

21. A laser transmitter as claimed in claim 1 wherein said controller is further programmed to:
modulate the intensity of said reference laser beam, and
toggle said modulation on and off in response to said target-missing signal.

22. A laser transmitter as claimed in claim 21 wherein said reference laser beam sweeps across said dither zone in first and second directions, and wherein said modulation is toggled on in said first direction and off in said second direction.

23. A laser transmitter as claimed in claim 21 wherein said modulation is toggled on for a first predetermined amount of time and off for a second predetermined amount of time.

24. A laser transmitter as claimed in claim 1 wherein said controller is further programmed to modulate the intensity of said reference laser beam, wherein said target-missing signal is characterized by a target-missing duration, and wherein said controller is further programmed to toggle said modulation on and off in response to a target-missing duration exceeding a predetermined toggle delay value.

25. A laser transmitter as claimed in claim 24 wherein said toggle delay value is at least as great as an amount of time necessary to permit removal of a target from, and reinsertion of said target into, said dither zone.

26. A laser transmitter as claimed in claim 24 wherein said controller is further programmed to:
produce a subsequent target-sighted signal; and
discontinue operation in said target dither mode and initiate operation in said search mode in response to said subsequent target-sighted signal and a subsequent target-sighted duration.

27. A laser transmitting system comprising:
a target;
a laser detection module operative to produce a reflected laser beam signal;
an optical system arranged to generate a reference laser beam selectively in one of a search mode and a target dither mode and to direct a laser beam reflected from said target to said laser detection module, wherein said optical system defines a rotational axis, said reference beam projects radially from said rotational axis, said search mode is characterized by movement of the reference beam through a rotational arc defined about said rotational axis, and wherein said target dither mode is characterized by movement of said reference beam through a portion of said rotational arc; and
a controller programmed to
produce selectively one of a target-sighted signal and a target-missing signal, wherein said target-sighted signal is produced in response to detection of said reflected laser beam,
produce a rotary position signal indicative of a position said reference beam relative to said rotational arc,
identify a target position based upon said reflected laser beam signal and said rotary position signal, establish said dither zone about said target position, wherein said dither zone occupies a portion of said rotational arc and is characterized by a dither range, move said reference beam in said target dither mode, wherein said target dither mode is characterized by reciprocative movement of said reference beam only through said dither zone, change a magnitude of said dither range in response to said target-sighted signal, and maintain a magnitude of said dither range substantially constant in response to said target-missing signal.

28. A method of transmitting a laser beam comprising the steps of:

moving a reference laser beam in a search mode, wherein said search mode is characterized by movement of said reference beam through a rotational arc defined about a rotational axis;

monitoring a rotary position of said reference laser beam relative to said rotational arc;

detecting a laser beam reflected from a target positioned within said rotational arc;

producing a target-sighted signal in response to said detection of said reflected laser beam;

producing a rotary position signal indicative of a position of said reference beam relative to said rotational arc;

identifying a target position based upon said detection of said reflected laser beam and said rotary position signal;

establishing a dither zone associated with said target position wherein said dither zone occupies a portion of said rotational arc and is characterized by a dither range;

moving said reference beam in a target dither mode, wherein said target dither mode is characterized by reciprocative movement of said reference beam only through said dither zone;

changing said dither range in response to said target-sighted signal; and maintaining said dither range substantially constant in response to a target-missing signal.

29. A method of transmitting a laser beam as claimed in claim 28 further comprising the step of maintaining a dither range center at said target position as said dither range changes.

30. A method of transmitting a laser beam as claimed in claim 28 further comprising the step of maintaining a dither range end point at said target position as said dither range changes.

31. A method of transmitting a laser beam as claimed in claim 28 wherein said dither range is changed independently of said target position.

32. A method of transmitting a laser beam as claimed in claim 28 further comprising the step of modulating the intensity of said reference beam and toggling said modulation on and off in response to a predetermined target-missing signal duration.

33. A method of transmitting a laser beam as claimed in claim 28 further comprising the steps of discontinuing operation in said target dither mode and initiating operation in said search mode in response to a subsequent target-sighted signal and a predetermined target-missing signal duration.

34. A method of transmitting a laser beam as claimed in claim 28 further comprising the step of focusing the reference laser beam at a target distance in response to receipt of said target-sighted signal.

35. A method of transmitting a laser beam as claimed in claim 28 further comprising the step of moving said reference beam in said search mode after detecting a laser beam reflected from a target positioned within said dither zone following movement of said reference beam in said target dither mode.

* * * * *